United States Patent [19]
Kitch

[11] 3,746,448
[45] July 17, 1973

[54] APPARATUS FOR PRODUCING POSITIVE OR NEGATIVE IMAGES ON A LIGHT ACTIVATABLE, THERMALLY DEVELOPABLE, DIAZOSULFONATE REPRODUCTION MATERIAL

[75] Inventor: Paul Edward Kitch, West Springfield, Mass.

[73] Assignee: Scott Paper Company, Delaware County, Pa.

[22] Filed: Dec. 6, 1971

[21] Appl. No.: 204,835

[52] U.S. Cl. .............................. 355/106, 219/216
[51] Int. Cl. ..................................... G03b 27/30
[58] Field of Search ................... 355/104, 106, 110, 355/117; 219/216

[56] References Cited
UNITED STATES PATENTS
| | | | |
|---|---|---|---|
| 3,397,630 | 8/1968 | Pratt | 355/106 |
| 3,450,474 | 6/1969 | Sloan et al. | 355/106 X |
| 3,582,207 | 6/1971 | Johnson et al. | 355/106 X |
| 3,449,547 | 6/1969 | Goodman et al. | 219/216 |

Primary Examiner—Samuel S. Matthews
Assistant Examiner—Fred L. Braun
Attorney—William J. Foley et al.

[57] ABSTRACT

An apparatus for selectively forming either positive or negative images on a light-activatable, thermally developable, diazosulfonate reproduction material. The material is heat treated prior to or subsequent to being passed through a re-exposure station spaced from the exposure station.

6 Claims, 2 Drawing Figures

APPARATUS FOR PRODUCING POSITIVE OR NEGATIVE IMAGES ON A LIGHT ACTIVATABLE, THERMALLY DEVELOPABLE, DIAZOSULFONATE REPRODUCTION MATERIAL

BACKGROUND OF THE INVENTION

1. Field of the Invention

The invention described herein was made under a contract with the United States Air Force.

The present invention relates generally to an apparatus for imaging a light-activatable, thermally developable reproduction material. More particularly the invention relates to an apparatus which is capable of selectively producing either positive or negative images on a light-activatable, thermally developable, diazosulfonate reproduction material.

2. Description of the Prior Art

In U. S. Pat. application, Ser. No. 32,420 entitled "Light Activated Diazography" filed Apr. 27, 1970, by Eric L. Girard there is disclosed and claimed a light-activatable, thermally developable, diazosulfonate, reproduction material comprising, in an acidic layer, an aryl diazosulfonate and an azo coupling component. The material is useful for photographically reproducing images contained on master transparencies, such as microfilm, microfiche and photographic films. As is described in the above-mentioned patent application both positive and negative copies can be prepared utilizing the reproduction materials described therein. One process described in the above application for preparing negative copies comprises:

a. image-wise exposing the material to light of wavelengths greater than a specific wavelength whereby the diazosulfonate in the light-struck areas of the light-sensitive layer is converted to a labile form which is substantially unaffected by light of said wavelengths.

b. raising the temperature of the material to an elevated level and maintaining said level for a time sufficient to cause the labile form to combine with a coupler to form an azo dye, and c. overall exposing the material to light having at least one wavelength longer than said specific wavelength and at least one wavelength less than said specific wavelength whereby the undeveloped diazosulfonate is converted to a labile form which is then decomposed.

In my U.S. Pat. application Ser. No. 205,045, entitled "Positive Working Diazosulfonate Imaging Process," filed, there is disclosed and claimed a process for preparing positive copies utilizing the light-activatable, thermally developable, diazolsulfonate, reproduction materials disclosed in U. S. Pat. application, Ser. No. 32,420. This process comprises:

a. image-wise exposing the material to light having at least one wavelength longer than a specific wavelength whereby the diazosulfonate in the light-struck areas of the light-sensitive layer is converted to a labile form which is substantially unaffected by light of said wavelengths.

b. overall exposing the material to light having at least one wavelength longer than said specific wavelength and at least one wavelength less than said specific wavelength whereby the remaining diazosulfonate is converted to a labile form and the labile form produced in step (a) is decomposed, and c. raising the temperature of the layer to an elevated level and maintaining said level for a time sufficient to cause the labile form of the diazosulfonate remaining in the layer to combine with the coupler to form an azo dye.

While it has previously been known that the light-activatable, thermally developable, diazosulfonate, reproduction materials disclosed in U. S. Pat. application, Ser. No. 32,420 were capable of being used to produce either positive or negative copies of a master transparency, there has not heretofore been available an apparatus capable of selectively producing either positive or negative copies utilizing said reproduction materials.

SUMMARY OF THE INVENTION

In accordance with the present invention either positive or negative copies can be produced on a light-activatable, thermally developable, diazosulfonate reproduction material utilizing an apparatus comprising:

a. an ultraviolet light source, b. a first support means providing an exposure station, spaced from said light source, at which the reproduction material is image-wise exposed to light from said light source, c. a second support means providing a re-exposure station, spaced from said light source and from said exposure station, at which the reproduction material is overall exposed to light from said light source, and d. a heating unit spaced from said re-exposure station in a position to selectively receive the reproduction material from, or transfer the reproduction material to, said re-exposure station.

DESCRIPTION OF THE PREFERRED EMBODIMENT

Figure 1:
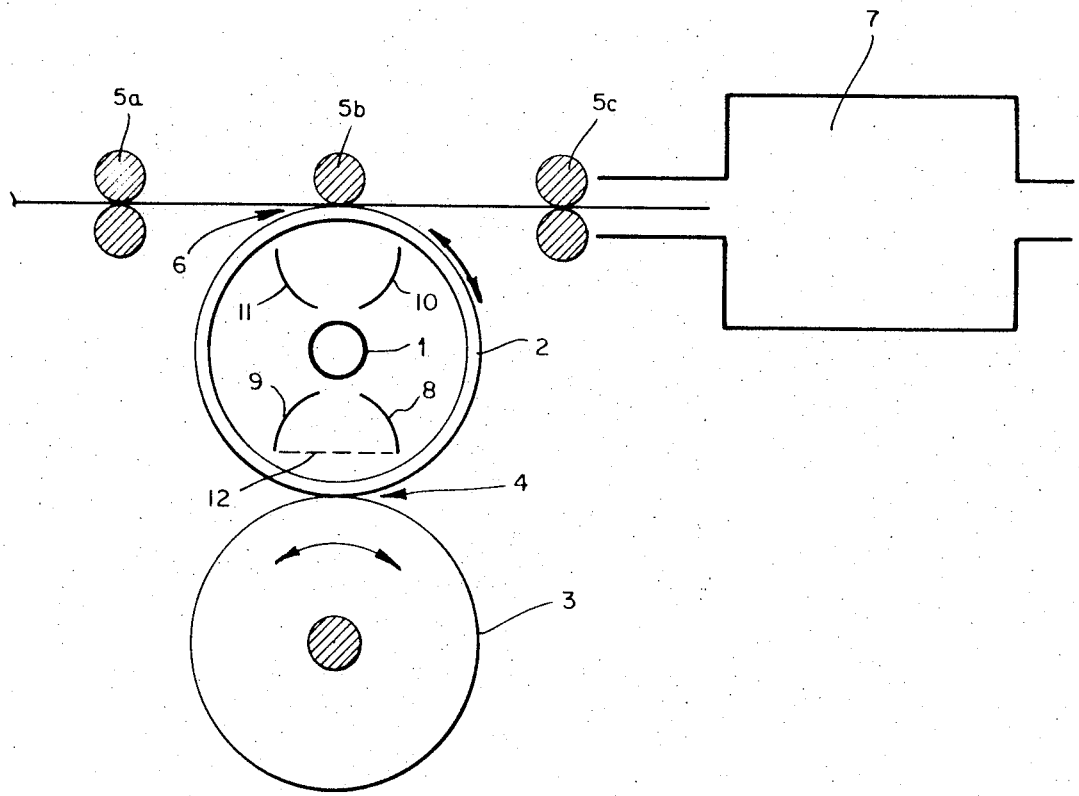
FIG. 1 is a schematic representation of an apparatus for producing either positive or negative images on a light-activatable, thermally developable, diazosulfonate, reproduction material.

The apparatus illustrated in FIG. 1 includes a light source 1, preferably having a light output within the range of from about 3,000 Angstroms to about 4,500 Angstroms. The light source is supported inside a rotatable, hollow, transparent cylinder 2 positioned to cooperate with a first support means 3, which is preferably in the form of a rotatable soft rubber roller, to provide an exposure station 4.

In operation the diazosulfonate reproduction material and the master transparency to be duplicated are fed together by any suitable means into the nip between the first support means 3 and the translucent cylinder 2. The master transparency is positioned on top of the reproduction material. The reproduction material is exposed to light from the light source 1 which is provided with reflectors 8 and 9. Since the master transparency is located on top of the reproduction material only those areas of the reproduction material which are beneath the non-image areas of the master are exposed to light. The light converts the diazosulfonate in the light-struck areas to a labile form. This labile form is capable of coupling, when heated, with the azo coupling component present in said material to yield a dye image in the light-struck areas. The result, if the material is heated after the initial exposure, is a negative print of the master transparency or, in other words, a print in which the image areas correspond to the non-image areas of the master. The labile form is also capable of decomposing to yield colorless products which are no longer capable, even when heated in the presence of the azo coupling component, of forming an azo dye.

In accordance with the present invention the exposed reproduction material, having part of the diazosulfonate now present in its labile form, can, if a negative print is desired, be heated by conveying the exposed material to a heating unit 7 wherein the material is heated to a temperature, and for a time, sufficient to cause the labile form of the diazosulfonate to react with the azo coupling component to form a dye image. The remaining diazosulfonate, i.e., that in the non-exposed areas of the material is removed by transferring the material to a re-exposure station 6 defined by a second support means in the form of rollers 5a, 5b, and 5c located adjacent to and in cooperating relation with cylinder 2. The reproduction material as it passes through said re-exposure station is exposed to light from the light source 1 which is provided with reflectors 10 and 11. The light converts the remaining diazosulfonate to a labile form which is then decomposed. The result is a negative print of the master transparency on a clear, colorless background.

The apparatus of the present invention is also capable of developing a positive print, or one in which the image areas correspond to the image areas of the master transparency, on the exposed reproduction material. This result is achieved by first transferring the exposed material in which the diazosulfonate in the light-struck areas is present as the labile form of the diazosulfonate to a re-exposure station 6 where the material is subjected to light from the light source 2. The light rays are sufficient to decompose the labile form of the diazosulfonate already present and to simultaneously convert the remaining diazosulfonate — i.e., that in the areas of the material which were not exposed to light at the exposure station — to the labile form. The material is then transferred to the heating unit 7 where it is heated to a temperature, and for a time, sufficient to cause the labile form of the diazosulfonate to react with the azo coupling component to form a dye image. The result is a positive print of the master transparency on a clear, colorless background.

The advantage of the present apparatus over those previously available is that by selectively changing the direction of travel of the exposed material through the re-exposure station and the heating unit, which are on a common path of travel of the reproduction material, either a positive or a negative print of the master transparency being duplicated can be obtained. If the exposed material is first re-exposed to light and then heated, a positive print will be obtained. If the exposed material is first heated and then re-exposed to light, a negative print will be obtained. In either case the print is a dense dye image on a clear, colorless background. It should be apparent that suitable drive means, not shown, of any conventional construction may be employed for driving the rotatable cylinder 2 and support means rollers 3 and 5 in synchronization and for selectively reversing the direction of rotation of these members to change from positive development operation to negative development operation and vice versa.

When negative prints are desired it is further preferred to include a filter 12 between the light source and the exposure station. Since the light which converts the diazosulfonate to its labile form is usually of a longer, or higher, wavelength than that which decomposes the labile form, by eliminating the wavelengths below a specific wavelength — i.e., the decomposing wavelengths — the maximum concentration of the labile form will be retained resulting in a print having maximum density.

Figure 2:
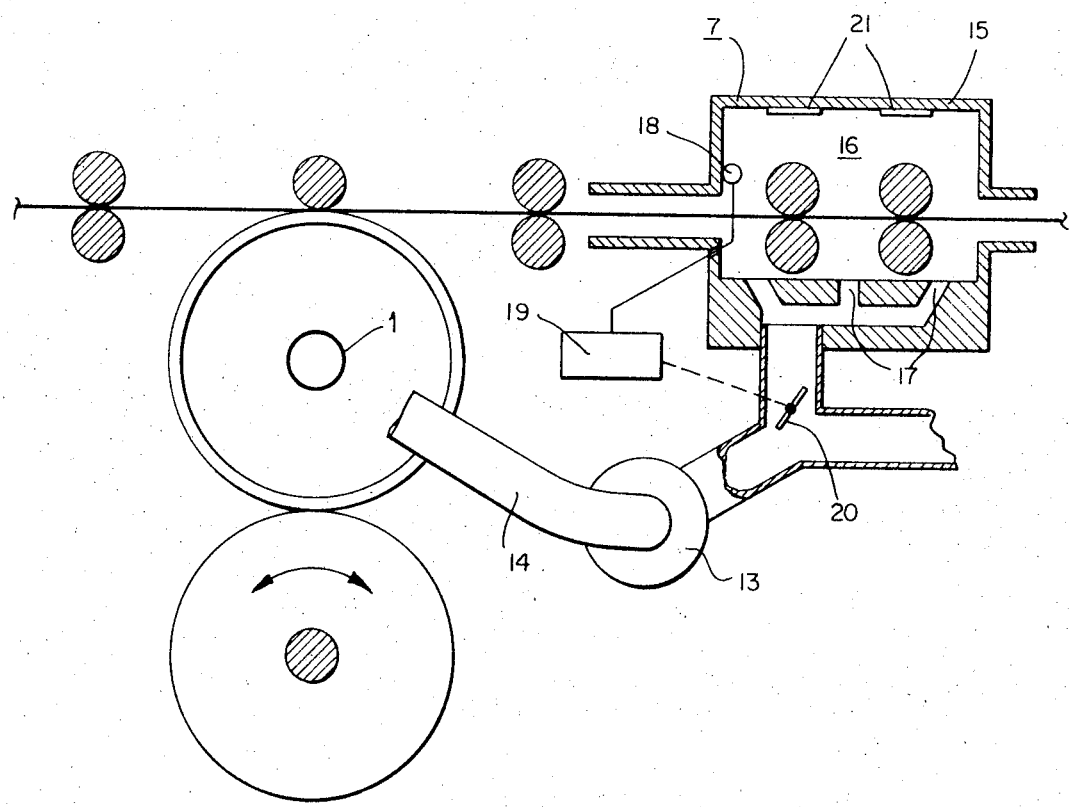
FIG. 2 is a schematic representation of an alternate apparatus of the type depicted in FIG. 1.

FIG. 2 depicts a modification of the apparatus depicted in FIG. 1. In the apparatus of FIG. 2 air which has been used to cool the light source 1 is utilized as a source of heat in the heating unit 7. The air is drawn by a blower 13 through a duct 14 connecting the end of the cylinder 2 and the heating unit 7. The heating unit consists of wall means 15 defining a chamber 16. The wall means has a series of openings 17 through which the hot air passes and impinges upon the reproduction material passing through said unit. A sensor device 18 is located in the chamber and connected to an activating means 19 which opens, or closes, a damper valve 20 when the temperature in the chamber falls below, or goes above, a preselected level.

To provide for instances in which the heat from the light source is not sufficient to maintain the desired temperature in the heating unit, supplemental heating means 21 such as resistive wires may be located in the wall means 15 of the heating unit near the surface defining the chamber 16 through which the reproduction material passes.

What is claimed is:

1. Apparatus for imaging a light-activatable, thermally-developable, reproduction material, said apparatus comprising:
   a. a light source,
   b. a first support means providing an exposure station, spaced from said light source, at which the reproduction material is image-wise exposed to light from said light source,
   c. a second support means providing a re-exposure station, spaced from said light source and from said exposure station, at which the reproduction material is overall exposed to light from said light source, and
   d. a heating unit providing a dye image forming station spaced from said exposure station and from said reexposure station in a position to selectively receive the reproduction material from, or transfer the reproduction material to, said re-exposure station.

2. Apparatus as claimed in claim 1, in which an optical filter is located between the light source and the exposure station, said optical filter adapted to block radiation of wavelengths less than a specific wavelength.

3. Apparatus as claimed in claim 2, in which the optical filter blocks radiation of wavelengths less than about 3,500 Angstroms.

4. Apparatus as claimed in claim 1, in which the heating unit comprises
   a. wall means defining a chamber, and
   b. transfer means for conducting air heated by the light source into the chamber.

5. Apparatus as claimed in claim 1, in which the light source is supported in a rotatable, translucent cylinder and the first support means is a rotatable rubber roll in contact with said cylinder.

6. Apparatus for imaging light-activatable, thermally developable, reproduction material, said apparatus comprising:
   a. a light source,
   b. a transparent cylinder surrounding said light source and rotatable past an exposure station and a reexposure station at the surface thereof,
   c. a material heating unit providing a dye image forming station on a path of material travel common to said unit and said re-exposure station, and
   d. means for selectively reversing the direction of rotation of said cylinder for receiving material at said re-exposure station from said heating unit or directing material from said re-exposure station to said heating unit.

* * * * *